US010223089B1

(12) United States Patent
Perron

(10) Patent No.: US 10,223,089 B1
(45) Date of Patent: *Mar. 5, 2019

(54) PARTIAL REDUNDANCY ELIMINATION WITH A FIXED NUMBER OF TEMPORARIES

(71) Applicant: INTERNATIONAL BUSINESS MACHINES CORPORATION, Armonk, NY (US)

(72) Inventor: Steven J. Perron, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,861

(22) Filed: Oct. 27, 2017

Related U.S. Application Data

(63) Continuation of application No. 15/690,767, filed on Aug. 30, 2017.

(51) Int. Cl.
| | | |
|---|---|---|
| *G06F 9/45* | (2006.01) | |
| *G06F 9/44* | (2018.01) | |
| *G06F 9/30* | (2018.01) | |
| *G06F 8/41* | (2018.01) | |

(52) U.S. Cl.
CPC ................. *G06F 8/4435* (2013.01)

(58) Field of Classification Search
CPC .. G06F 9/30189; G06F 9/342; G06F 9/30185; G06F 9/30101; G06F 8/443; G06F 8/4435; G06F 11/3604; G06F 17/30424; G06F 21/16; G06F 9/4494; G06F 12/0207; G06F 12/04; G06F 12/0607; G06F 17/5045; G06F 21/125; G06F 21/14

See application file for complete search history.

(56) References Cited

U.S. PATENT DOCUMENTS

| | | |
|---|---|---|
| 8,205,192 B2 | 6/2012 | Ogasawara et al. |
| 8,516,222 B1 | 8/2013 | Agarwal et al. |
| 8,555,266 B2 | 10/2013 | Copeland et al. |
| 8,789,032 B1 | 7/2014 | Li et al. |
| 8,799,882 B2 | 8/2014 | Tarditi, Jr. et al. |

(Continued)

OTHER PUBLICATIONS

Saleena et al., Global value numbering for redundancy detection: a simple and efficient algorithm, 3 pages (Year: 2014).*

(Continued)

*Primary Examiner* — Thuy Dao
(74) *Attorney, Agent, or Firm* — Tihon Poltavets

(57) ABSTRACT

A method for partial redundancy elimination with a fixed number of temporaries includes determining local data values of program code that describe a temporary memory location, a set of registers, and a set of basic blocks. The method determines global data values of the program code based on the determined local data values of the program code. The method removes a first load of the temporary memory location in a first basic block in the program code. The method adds a second load on a first edge from a second basic block out of the set of basic blocks to a third basic block out of the set of basic blocks in the program code. The method performs a register move on a second edge from the third basic block to the second basic block in the program code.

7 Claims, 5 Drawing Sheets

(56) References Cited

U.S. PATENT DOCUMENTS

| | | | | |
|---|---|---|---|---|
| 8,954,942 | B2* | 2/2015 | Krishnamurthy | G06F 9/4493 |
| | | | | 717/151 |
| 8,966,457 | B2* | 2/2015 | Ebcioglu | G06F 17/5045 |
| | | | | 716/105 |
| 9,424,038 | B2 | 8/2016 | Diamos et al. | |
| 9,448,778 | B2* | 9/2016 | Doyle | G06F 8/443 |
| 9,733,913 | B2* | 8/2017 | Bharadwaj | G06F 9/06 |
| 9,851,959 | B2 | 12/2017 | Edler Von Koch | |
| 10,061,571 | B2* | 8/2018 | Larin | G06F 8/4441 |
| 2006/0158354 | A1 | 7/2006 | Aberg et al. | |
| 2007/0169030 | A1 | 7/2007 | Tarditi, Jr. et al. | |
| 2018/0081650 | A1* | 3/2018 | Larin | G06F 8/443 |

OTHER PUBLICATIONS

Sioutis et al., Efficiently Reasoning about Qualitative Constraints through Variable Elimination, 10 pages (Year: 2016).*

IBM, List of IBM Patents or Patent Applications Treated as Related, Appendix P, dated Oct. 30, 2017, 2 pages.

Pending U.S. Appl. No. 15/690,767, filed Aug. 30, 2017, entitled: "Partial Redundancy Elimination With a Fixed Number of Temporaries", pp. 1-37.

Absar et al, "Eliminating Partially-Redundant Array-Bounds Check in the Android Dalvik JIT Compiler", PPPJ'11, Aug. 24-26, 2011, pp. 1-8.

Li et al., "Dynamic Register Promotion of Stack Variables", 2011 IEEE, pp. 21-31.

Grace Period Disclosure, IBM, IBM XL C/C++ for Linux 13.1.5—United States, http://www-01.ibm.com/support/docview.wss?uid=swg24042867,printed Aug. 21, 2017, pp. 1-6.

Grace Period Disclosure, Trudeau, "Download XL C/C++ for Linux, V13.1.5 Community Edition, a no-charge, fully-functional, unlimied-production-use compiler", IBM XL C, C++ and Fortran Compilers for POWER servers blog, https://www.ibm.com/developerworks/community/blogs/572f1 . . . , Dec. 15, 2016, pp. 1-3.

Kennedy et al., "Partial Redundance Elimination in SSA Form", ACM Transactions on Programming Languages and Systems, vol. 21, No. 3, May 1999, pp. 627-676.

Morel et al., "Global Optimatization by Suppression of Partial Redundancies", Communications of the ACM, Feb. 1979, vol. 22, No. 2, pp. 1-8.

Vandrunen et al., "Value-Based Partial Redundancy Elimination", E. Duesterwald (Ed.): CC 2004, LNCS 2985, pp. 167-184, 2004.

Knoop et al., "Lazy Code Motion", Abstract, ACM SIGPLAN '92, ACM 0-89791, 1992, pp. 1-11.

Paleri et al., "A Simple Algorithm for Partial Redundancy Elimination", ACM Sigplan Notices, V.33 (12) Dec. 1998, pp. 1-9.

* cited by examiner

| Memory Location | Register | Operation | Basic Block |
|---|---|---|---|
| M1 | r1 | load | BB2 |
| M1 | r2 | store | BB8 |
| M2 | r2 | store | BB2 |
| M2 | r2 | load | BB4 |
| M2 | r3 | load | BB7 |
| M3 | r1 | load | BB3 |
| M3 | r1 | load | BB6 |
| - | r1 | kill | BB5 |

FIG. 4

|  | Available | Partially Available | Operation | Basic Block |
|---|---|---|---|---|
| BB1 | unavailable | unavailable | r1 | r1 |
| BB2 | r1 | r1 | unavailable | unavailable |
| BB3 | unavailable | unavailable | unavailable | unavailable |
| BB4 | r1 | r1 | unavailable | unavailable |
| BB5 | unavailable | r1 | unavailable | unavailable |
| BB6 | unavailable | unavailable | unavailable | unavailable |
| BB7 | unavailable | r1 | unavailable | unavailable |
| BB8 | r2 | r2 | unavailable | r1 |

PARTIAL REDUNDANCY ELIMINATION WITH A FIXED NUMBER OF TEMPORARIES

STATEMENT REGARDING PRIOR ART DISCLOSURES BY THE INVENTOR OR A JOINT INVENTOR

Aspects of the present invention have been disclosed by another, who obtained the subject matter disclosed directly from the inventor, in the product IBM XL C/C++ for Linux 13.1.5, made available to the public on Dec. 14, 2016. These aspects, as they may appear in the claims, may be subject to consideration under 35 U.S.C. § 102(b)(1)(A).

FIELD OF INVENTION

This disclosure relates generally to compiler optimization, and in particular, to partial redundancy elimination with fixed number of temporaries.

BACKGROUND OF THE INVENTION

Partial redundancy elimination is a compiler optimization that eliminates expressions that are redundant on some but not necessarily all paths through a program. Presently, many different partial redundancy elimination (PRE) algorithms attempt to solve the issue of redundancy, while taking different priorities into consideration. However, PRE algorithms commonly assume there is an unlimited number of temporary memory locations available that can store a value of an expression for an undefined period of time. Such an assumption of an infinite number of temporary memory location is typical when performing redundancy elimination early in the optimization phase.

SUMMARY

Embodiments in accordance with the present invention disclose a method, computer program product and computer system for partial redundancy elimination, the method comprising, determining, by one or more processors, local data values of program code that describe a temporary memory location, a set of registers, and a set of basic blocks, wherein the local data values are determined in a single pass through each basic block of the set of basic blocks; determining, by one or more processors, global data values of the program code based on the determined local data values of the program code, wherein the global data values of the program code indicate whether a register is available, partially available, anticipatable, or partially anticipatable for each basic block of the set of basic blocks; removing, by one or more processors, based on the determined global register status values meeting a first set of requirements, a first load of the temporary memory location into a second register, from a first basic block out of the plurality of basic blocks; on a first edge from a second basic block out of the plurality of basic blocks to the first basic block, adding, by one or more processors, based on the determined global register status values meeting a second set of requirements, a second load of the temporary memory location into the second register; and on a second edge from the first basic block to the second basic block, performing, by one or more processors, based on the determined global register status values meeting a third set of requirements, a register move, wherein the first register is moved into the second register.

BRIEF DESCRIPTION OF THE SEVERAL VIEWS OF THE DRAWINGS

FIG. 4 is a table of characteristics for a set of memory locations and registers associated with the control flow graph of FIG. 3, in accordance with an embodiment of the present invention.

FIG. 5 is a table of global information for memory location M1 of FIG. 4 processed by the partial redundancy elimination module, in accordance with an embodiment of the present invention.

DETAILED DESCRIPTION

Figure 1:
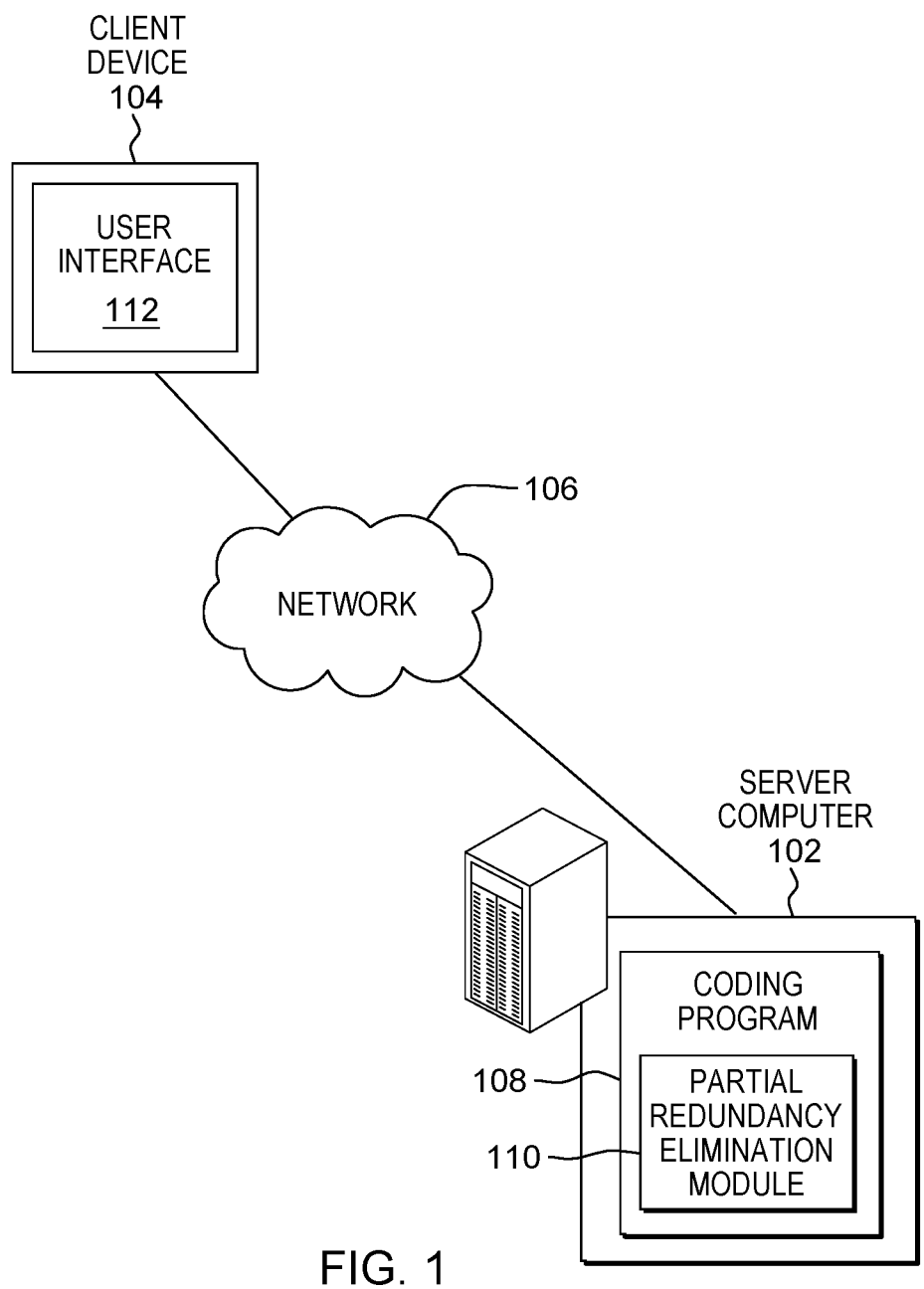
FIG. 1 is a functional block diagram illustrating a distributed data processing environment, in accordance with an embodiment of the present invention.

The compiler performs a register allocation, which assigns each of the symbolic registers to a real register, where the number of real registers is limited to a fixed number (e.g., 32 general purpose registers). During register allocation, the amount of symbolic registers may exceed the number of real registers due to the symbolic registers being utilized at one point in the code being compiled. To compensate for the lack of available real registers, the compiler "spills" and places a symbolic register back in memory for a portion of the program to reduce the number of real registers required at a given point in the code being compiled. As a result, the compiler can load a "spill" location into a register, while the value is still available in another register, resulting in a redundant load of the "spill" location. Performing partial redundancy elimination with a fixed number of temporaries due to a limited number of real registers on the hardware, allows for the removal of any unnecessary (i.e., redundant) loads. Specifically, during later stages of an optimization phase after register assignments (i.e., register allocation), when there is a limited pool of memory locations that can be used to clean up any spill code. Furthermore, a portion of the limited pool of the memory location can be utilized for other tasks, where the limited pool of memory locations is even further reduced.

Embodiments of the present invention perform a partial redundancy elimination with a fixed number of temporaries one expression at a time, where there is a load of memory location M, temporary locations are the set of registers R={r1, r2, . . . , rn, unavailable}, and a control flow graph is available with BB={bb1, . . . , bbm} as the set of basic blocks, with a set of edges describing the relations between the set of basic blocks of the control flow graph.

Identifying the local data values is performed, where locally_anticipatable: BB→R, by setting locally_anticipatable (bb)=r where M is loaded in r, where r is not live at any point from the start of bb to the load of M. Otherwise, set locally_anticipatable (bb)=unavailable. To compute locally_available: BB→r, set locally_available (bb)=r if there is an instruction in bb that ensures that M and r have the same value, and it remains true at the end of bb. Otherwise, set locally_unavailable (bb)=unavailable. To determine stored: BB→{true, false}, set stored (bb)=true if there is an instruction that stores to M somewhere in bb. Otherwise, set stored(bb)=false. To determine regs_killed: BB×R→{false, true}, set reg_killed(bb,r)=true if the value of r changes at a point in bb. Otherwise, set regs_killed (bb,r)=false.

Local data values are utilized to determine the global data values, where to determine available: BB→R, set available (bb)=r if on all paths that lead to the end of bb it is possible to get r and M to have the same value by adding register moves between the temporary location. Otherwise, set available (bb)=unavailable. To determine partially_available: BB→R, set partially_available (bb)=r if on a path that leads to the end of bb, r and M have the same value without the addition of extra instructions. To determine anticipatable: BB→{true, false}, set anticipatable(bb)=true if on every path (p1, . . . , pn), where p1=bb and pn=end_node there is a pj, where locally_anticipatable (pj)!=unavailable and for every i<j, partially_available (pi)!=unavailable. The value of M is kept in a register and eventually leads to a load that can be removed. Otherwise, set anticipatable(bb)=false. To determine partially_anticipatable BB→{true, false}, set partially_anticipatable (bb)=true which is similar to anticipatable (bb) except it requires to be true for a single path and not every path.

Utilizing the determined global data values allows for the modifying of the program code to reduce the number of times M is loaded. Adding register moves or loads, while removing loads in other locations allows for the number of times M is loaded to be reduced. Table 1 includes the processed determined global data values.

Table 1: Processed Determined Global Data Values

```
void foo ( )
{
  //bb1
  r1=1
  M1=r1;
  if (C1)
  {
    //bb2
    r1=M2
  }
  else
  {
    //bb3
    M1=r2
    r1=M3
  }
  //bb4
  r1=M1
  r2=M2
  M1=r2
  r2=M3
}
```

Temporary memory M1 is available at the end of bb1 in r1 and bb3 in r2, but not in bb2, since r1 is changes, or bb4, since r2 changes before the end of the block. Embodiments of the present invention perform partial redundancy elimination by adding a load of M1 at the end of bb2, since r1 is not live, and moving r2 to r1 at the end of bb3. Subsequently, embodiments of the present invention removes the load of M1 in bb4, since bb4 is partially available and locally anticipatable. Embodiments of the present invention prevents the partial redundancy elimination with fixed number of temporaries algorithm from allowing M1 to be available across all basic blocks by preventing a load of M1 into a new register that does not exist in the limited amount of registers.

FIG. 1 is a functional block diagram illustrating a distributed data processing environment, in accordance with one embodiment of the present invention. The distributed data processing environment includes server computer 102 and client device 104 interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information. Server computer 102 includes coding program 108 and partial redundancy elimination module 110.

Client device 104 may be a laptop computer, tablet computer, netbook computer, personal computer (PC), personal digital assistant (PDA), smart phone, wearable device (e.g., smart watch, personal fitness device, personal safety device), or any programmable computer system known in the art with an interactive display. Client device 104 includes user interface 112 and may include a client side coding program 108 and partial redundancy elimination module 110, not illustrated in FIG. 1. In general, client device 104 is representative of any programmable electronic device or combination of programmable electronic devices capable of executing machine-readable program instructions and communicating with users of other electronic devices via network 106. Client device 104 may include components, as depicted and described in further detail with respect to FIG. 6, in accordance with embodiments of the present invention.

Coding program 108 can be an optimizing compiler that minimizes and maximizes certain attributes of an executable computer program. For example, minimizing the time required to execute a computer program is an example of an attribute that the optimizing compiler tries to minimize. Partial redundancy elimination module 110 located in coding program 108, provides partial redundancy elimination utilizing a fixed number of temporaries in an optimization compiler. Partial redundancy elimination module 110 determines local data values and global data values, where the global data values are determined based on the local data values. Partial redundancy elimination module 110 defines a safety check to ensure memory locations are allocated and pointers are valid. Additionally, the safety check eliminates the possibility of adding extra loads. Partial redundancy elimination module 110 identifies an operation to perform on the program code, for example, remove a load, add a load, and add a register move. Subsequent to identifying the operation, partial redundancy elimination module 110 performs the identified operation on the program code. Removing a load, adding a load, and adding a register move allows for the partial redundancy elimination for the fixed number of temporaries, or in this embodiment, registers.

In general, network 106 can be any combination of connections and protocols that will support communications between server computer 102 and client device 104. Network 106 can include, for example, a local area network (LAN), a wide area network (WAN), such as the internet, a cellular network, or any combination of the preceding, and can further include wired, wireless, and/or fiber optic connections. In one embodiment, coding program 108 with partial redundancy elimination module 110 can be a web service accessible via network 106 to a user of client device 104. In another embodiment, coding program 108 with partial redundancy elimination module 110 may be operated directly by a user of server computer 102.

Client device 104 also includes user interface (UI) 112 and various programs (not shown). Examples of the various programs on client device 104 include: a web browser, an e-mail client, security software (e.g., a firewall program, a geo-locating program, an encryption program, etc.), an instant messaging (IM) application (app), and a communication (e.g., phone) application. In an example, a user of client device 104 can interact with user interface 112, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate user interface 112 operating within the GUI of client device 104. User interface 112 accepts input from a plurality of input/output (I/O) devices including, but not limited to, a tactile sensor interface (e.g., a touch screen, a touchpad) referred to as a multi-touch display. An I/O device interfacing with user interface 112 may be connected to client device 104, which may operate utilizing wired (e.g., USB port) or wireless network communications (e.g., infrared, NFC, etc.).

Figure 2:
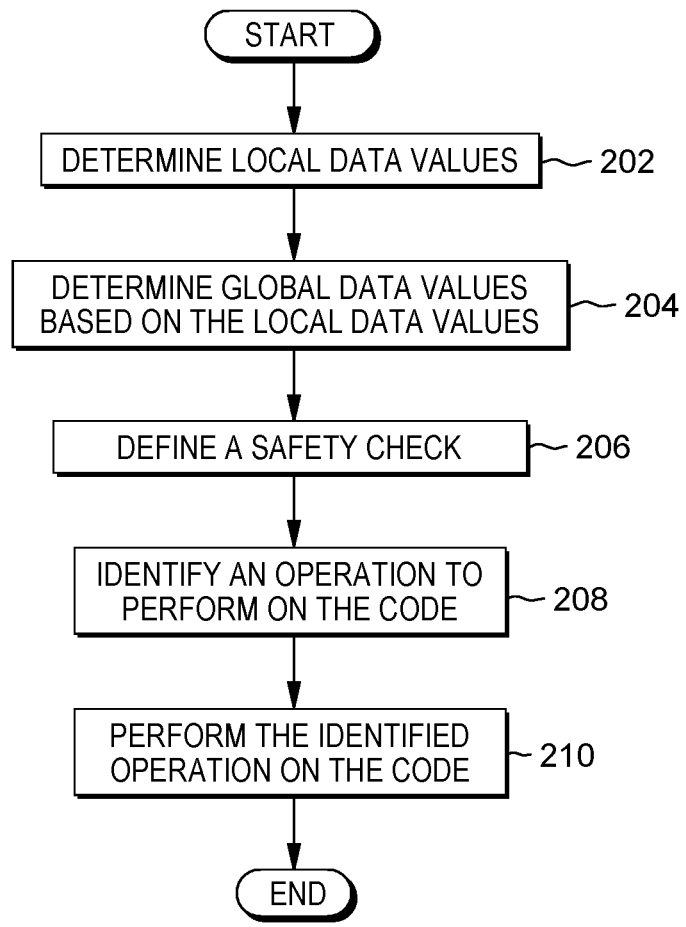
FIG. 2 is a flowchart depicting operational steps of a partial redundancy elimination module for eliminating redundancy with fixed number of temporaries, in accordance with an embodiment of the present invention.

FIG. 2 is a flowchart depicting operational steps of a partial redundancy elimination module for eliminating redundancy with fixed number of temporaries, in accordance with an embodiment of the present invention.

Partial redundancy elimination module 110 determines local data values (202). In this embodiment, partial redundancy elimination module 110 attempts to remove redundant machine operation (i.e., loads) of a target memory location M. The local data includes locally anticipatable (locally_anticipatable), locally available (locally_unavailable), register kills (regs_kill), and stored (stored), for each basic block (bb) in a control flow graph. For each basic block (bb) in the control flow graph, partial redundancy elimination module 110 sets locally_anticipatable (bb)=unavailable. For each instruction (i) in basic block (bb), starting at the end of the basic block (bb) and moving towards the start if ((i) references the register currently stored in locally_anticipatable (bb)), partial redundancy elimination module 110 sets locally_anticipatable (bb)=unavailable. As a result, the register into which the target memory location M is loaded, is used elsewhere and partial redundancy elimination module 110 cannot alter the value. Alternatively, if ((i) is a load of target memory location M into a register (r)), partial redundancy elimination module 110 sets locally_anticipatable(bb)=r.

For each basic block (bb) in the control graph, partial redundancy elimination module 110 sets locally_unavailable (bb)=unavailable. For all registers (r), regs_killed (bb,r)= false. For each instruction (i) in basic block (bb), starting at the end of the basic block (bb) and moving towards the start if ((i) is load of the target memory location M into a register (r) and locally_available (bb)=unavailable), if (!regs_killed (bb,r)), locally_unavailable (bb)=r. For all registers (r) killed by (i), regs_killed (bb,r)=true. For each basic block (bb) in the control graph, partial redundancy elimination module 110 sets stored (bb)=false. For each instruction (i) in basic block (bb), starting at the end of the basic block (bb) and moving towards the start if ((i) is a store to the target memory location M), stored (bb)=true. Due to partial redundancy elimination module 110 utilizing the same order of processing each basic block (bb), partial redundancy elimination module 110 can determine the local data values through a single pass of each of the basic block (bb).

Partial redundancy elimination module 110 determines global data values based on the local data values (204). In this embodiment, based on the determined local data values, partial redundancy elimination module 110 produces the global data values by determining a fixed point for the given expression. The global data indicates if a register is available (available), partially available (partially_available), anticipatable (anticipatable), and partially anticipatable (partially_anticipatable), for each basic block (bb) in a control flow graph. Partial redundancy elimination module 110 sets available (bb)=r if and only if (locally_available (bb)=r) or for all predecessors (bp) of (bb), available (bp)!=unavailable, and there exists a predecessor (bp) of (bb), available(bp)=r, and !regs_killed(bb,r).

Partial redundancy elimination module 110 sets partially_available (bb)=r if and only if (locally_available (bb)=r) or there exists a predecessor (bp), partially_available (bp)=r, and !regs_killed (bb,r). Partial redundancy elimination module 110 sets anticipatable (bb)=true if and only if (partially_available [bb]!=unavailable) and there exists a successor (bs) and for all successors (bs), (locally_anticipatable!=unavailable) or (!stored [bs] && anticipatable (bs)). Partial redundancy elimination module 110 sets partially_anticipatable (bb)=(locally_anticipatable [bb]!= unavailable and there exists (bp) such that partially_unavailable (bb)!=unavailable) or (!stored (bb) and there exists (bs) such that partially_anticipatable (bs)).

Partial redundancy elimination module 110 defines a safety check (206). In this embodiment, partial redundancy elimination module 110 defines an extra relation which serves as a safety check, where partial redundancy elimination module 110 cannot move a load (or pointer dereference) to a location, where execution would occur on a path where the execution previously did not occur. If partial redundancy elimination module 110 moves a load to an "unsafe" location, there is a possibility the memory location is not allocated or the pointer is not valid, resulting in a segmentation fault or other error to occur. Additionally, a safety check ensures partial redundancy elimination module 110 does not add extra loads, which previously did not exist. Continuing the previous example, partial redundancy elimination module 110 sets the follow safety check, IsSafe(bb)=anticipatable (bb) or locally_available (bb)!=unavailable or (available (bb) and !stored (bb)).

Partial redundancy elimination module 110 identifies an operation to perform on the code (208). In this embodiment, partial redundancy elimination module 110 identifies three operations to perform on the code, remove load, add load, and add register move. Partial redundancy elimination module 110 performs the identified operation on the code (210). Continuing from the previous example, partial redundancy elimination module 110 determines a redundant machine operation exists and performs a remove load, where the first load of the target memory location M is removed from basic block (bb) if and only if locally_anticipatable (bb)!=unavailable and there exists a predecessor (bp) such that (partially_available (bp) && IsSafe (bp)). In this example, there is a load in (bb), where the load is not required in all paths of the control flow graph. If a predecessor (bp) exists, the target memory location is already available in a register and partial redundancy elimination module 110 removes the load. However, with the removal of the load, partial redundancy elimination module 110 adds loads on paths where the target memory location is not available and ensure the target memory location is in the correct register on paths where the target memory location is available.

Partial redundancy elimination module 110 performs an add load, where a load is added on the edge from (bp) to (bs) if and only is one of the following conditions is true: remove_load(bs) and (partially_available (bp)==available or !IsSafe (bp)), or IsSafe (bs), partially_anticipatable (bs) && locally_available(bs)!=partially_available(bs), and (!IsSafe(bp) or partially_available (bp)==unavailable). In this example, with respect to the first condition, partial redundancy elimination module 110 has previously removed a load from (bs) and partial redundancy elimination module 110 has to make the value available on all paths leading to (bs). When approaching from (bp) and the load is not safe, partial redundancy elimination module 110 cannot make the load available earlier than the edge from (bs) to (bp). As a result, partial redundancy elimination module 110 adds the load at the edge from (bs) to (bp). Similarly if the load is not partially available at the end of (bp), partial redundancy elimination module 110 adds a load for every path that includes the edge from (bs) to (bp). With respect to the second condition, partial redundancy elimination module 110 searches (bs) and identifies a point where a load is to be removed. In the event the value is locally available and in an expected register, partial redundancy elimination module 110 utilizes the value and determining whether the temporary memory storage M is available coming into (bs), is no longer required. In the event the temporary memory storage M is not locally available in (bs), partial redundancy elimination module 110 ensures the temporary memory storage M is available on all paths leading to (bs). Partial redundancy elimination module 110 makes the value available on the edge from (bs) to (bp) where required, utilizing reasoning similar to the first condition mentioned above.

Partial redundancy elimination module 110 performs an add register move on the edge from (bs) to (bp) if and only if one of the following conditions is true: remove_load (bs) and !(partially_available(bp)==unavailable or !IsSafe(bp)) and partially_available!=locally_anticipatable(bs) or IsSafe (bs) and partially_anticipatable(bs) && locally_available (bs)!=partially_available(bs) and !(!IsSafe(bp) or partially_available(bp)==unavailable) and partially_available (bp)!=partially_available (bs). Partial redundancy elimination module 110 determines that a load was removed and a value is available in a register. In the event, partial redundancy elimination module 110 determines the value is not in the correct register, partial redundancy elimination module 110 performs a register move if one of the above mention conditions is met.

Figure 3:
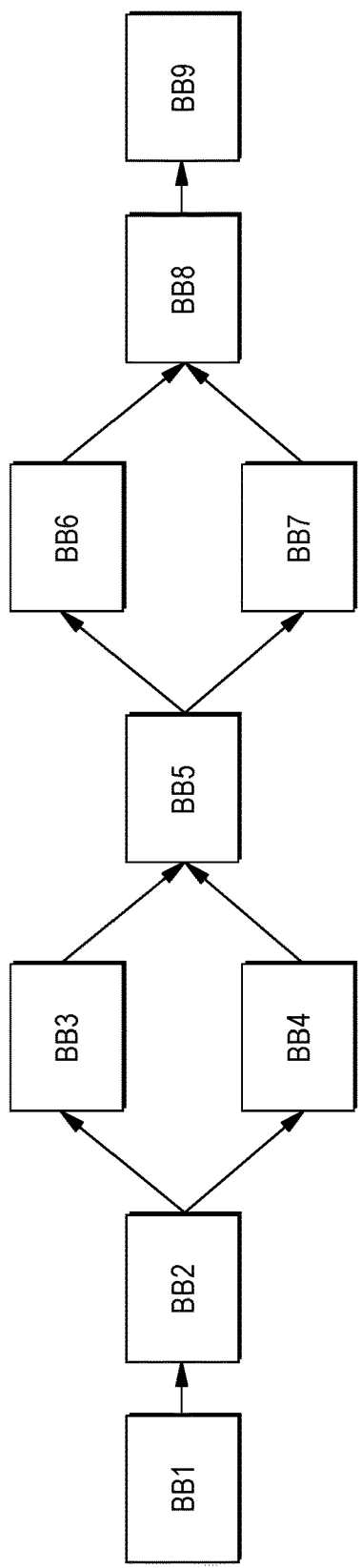
FIG. 3 is an example of a control flow graph for which a partial redundancy elimination module performs redundancy elimination, in accordance with an embodiment of the present invention.

FIG. 3 is an example of a control flow graph for which a partial redundancy elimination module performs redundancy elimination, in accordance with an embodiment of the present invention. In this example, a control flow graph is provided with 9 different basic blocks (BB). Basic blocks (BB) 2, 3, 4, and 5 form a first if-then-else flow in the control flow graph and basic blocks (BB) 5, 6, 7, and 8 form a second if-then-else flow in the control flow graph.

FIG. 4 is a table of characteristics for a set of memory locations and registers associated with the control flow graph of FIG. 3, in accordance with an embodiment of the present invention. In this example, there are 4 memory locations and 3 registers. Basic Block 2 (BB2) includes a load operation of memory location M1 in register r1 and BB8 includes a store operation of memory location M1 in register r2. BB2 includes a store operation of memory location M2 in register r2, BB4 includes a load operation of memory location M2 in register 2, and BB7 includes a load operation of memory location M2 in register r3. BB3 includes a load operation of memory location M3 in register r1 and BB6 includes a load operation of memory location M3 in register r1. BB5 performs a kill operation, where based on the control flow graph of FIG. 3, makes the load operation of memory location M2 at BB7 unavailable.

FIG. 5 is a table of global information for memory location M1 of FIG. 4 processed by the partial redundancy elimination module, in accordance with an embodiment of the present invention. Partial redundancy elimination module 110 processes the memory location M1 and determines the global data values based on the local data values for memory location M1. Memory location M1 becomes unavailable in BB3 and BB6 because memory location M3 is loaded into register r1. Previously, standardized algorithms assume there is an additional temporary which can be utilized, compared to the present algorithm of partial redundancy elimination module 110 which utilizes a limited number of registers. Based on the table of global information for memory location M1, partial redundancy elimination module 110 identifies and perform the operations on the code (i.e., remove load, add load, and add register move).

Partial redundancy elimination module 110 determines memory location M1 is available in register r2 at the end (i.e., edge) of BB8 and partial redundancy elimination module 110 removes the load in BB2. Subsequent to the removing the load in BB2, partial redundancy elimination module 110 adds a load of memory location M1 into register r1 at the end of BB1. Due to the latch between BB8 to BB1, partial redundancy elimination module 110 performs a register move of register r2 into register r1 in order to correct the code. Partial redundancy elimination module 110 cannot change the register move of register r2 to register r1 at the end of BB8 or the start of BB2 and would need to create a new basic block between BB8 and the start of BB2 to add the code. For memory location M1, partial redundancy elimination module 110 removes the load in BB4 due to the availability. However, partial redundancy elimination module 110 will not remove the load in BB7 because the "kill" in BB5 will force BB7 to become unavailable. Due to the present algorithm of partial redundancy elimination module 110, memory location M2 is not available because of the fixed number of registers, where previous algorithms utilizes an arbitrary number of registers allowing for memory location M2 to be available. As for memory location M3, present algorithm of partial redundancy elimination module 110 does not remove either of the two loads at BB3 and BB6 due to the safety condition not being met.

Figure 6:
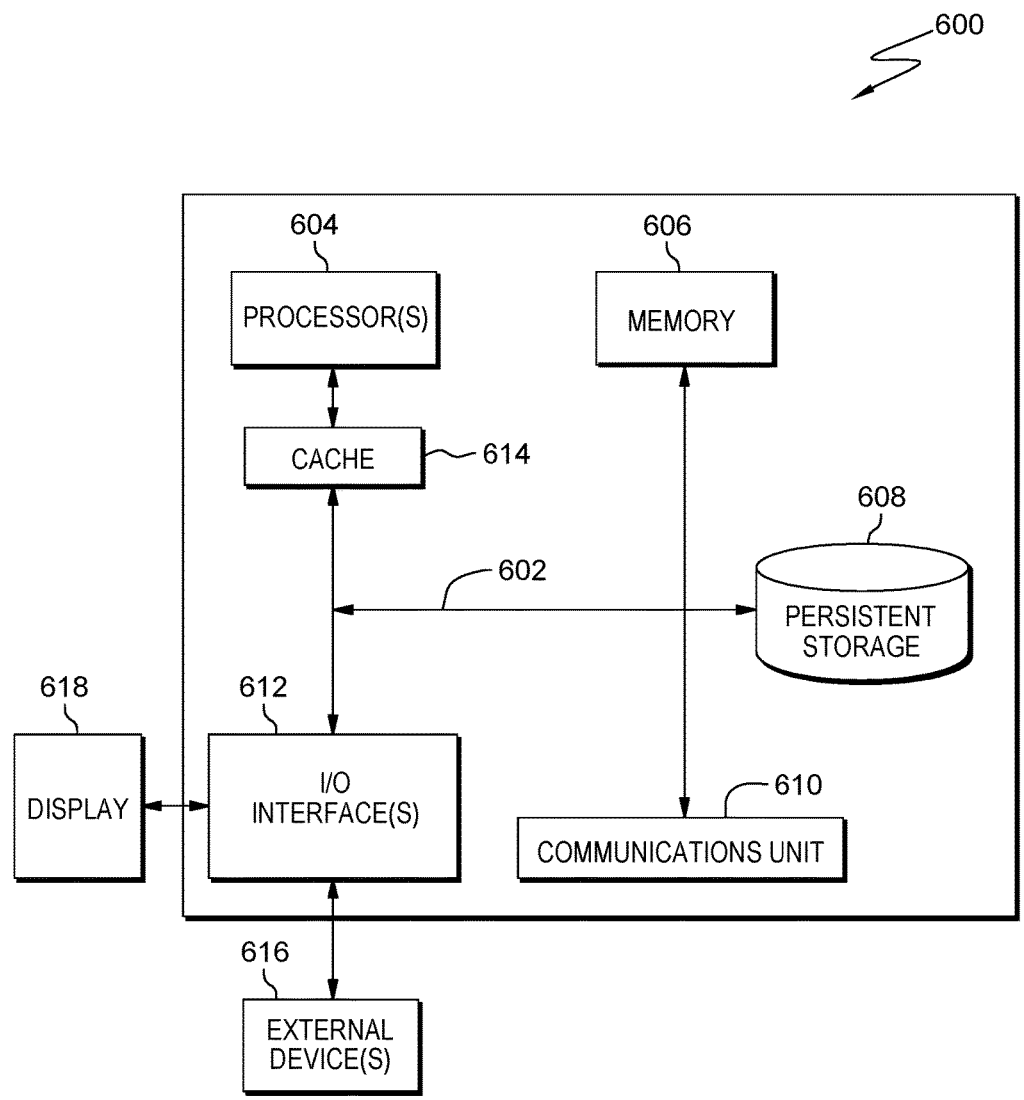
FIG. 6 is a block diagram of components of a computer system, such as the server computer of FIG. 1, in accordance with an embodiment of the present invention.

FIG. 6 depicts computer system 600, where server computer 102 is an example of a system that includes coding program 108 and partial redundancy elimination module 110. The computer system includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 602 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 606 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   in a single pass through a program code divided into a plurality of basic blocks, identifying, by one or more processors, for each basic block, a set of local data values that includes: a temporary memory location identifier, a register identifier of a set of registers, and a basic block identifier of the basic block;
   for each basic block of the set of basic blocks, determining, by one or more processors, global register status values for the registers identified in the basic block, wherein the global register status values indicate whether a register is available, partially available, anticipatable, or partially anticipatable, and wherein the global register status values are determined based on machine operations on the identified registers across the plurality of basic blocks;
   removing, by one or more processors, based on the determined global register status values meeting a first set of requirements, a first load of the temporary memory location into a second register, from a first basic block out of the plurality of basic blocks;
   on a first edge from a second basic block out of the plurality of basic blocks to the first basic block, adding, by one or more processors, based on the determined global register status values meeting a second set of requirements, a second load of the temporary memory location into the second register; and
   on a second edge from the first basic block to the second basic block, performing, by one or more processors, based on the determined global register status values meeting a third set of requirements, a register move, wherein the first register is moved into the second register.

2. The method of claim 1, wherein the first set of requirements includes:
   the first basic block with the second register is locally anticipatable;
   the second basic block is a predecessor block with the first register being partially available; and
   a safety check for preventing new execution paths of the second basic block is present in the program code.

3. The method of claim 1, wherein the second set of requirements includes:
   the second basic block with the first register is partially unavailable; or
   a safety check for preventing new execution paths of the second basic block is not present in the program code.

4. The method of claim 1, wherein the second set of requirements includes:
   a safety check for preventing new execution paths of the first basic block is present in the code; and
   the first basic block with the second register is partially anticipatable and locally available.

5. The method of claim 1, wherein the second set of requirements includes:
   a safety check for preventing new execution paths of the second basic block is not present in the program code; or
   the second basic block with the first register is partially unavailable.

6. The method of claim 1, wherein the third set of requirements includes:
   the second basic block with the first register is partially available and locally anticipatable.

7. The method of claim 1, wherein the second basic block is a predecessor block and the first basic block is a successor block.

* * * * *